Patented Oct. 3, 1939

2,175,095

UNITED STATES PATENT OFFICE 2,175,095

TREATMENT OF WELLS

Sylvia M. Stoesser, Midland, Mich., assignor to The Dow Chemical Company, Midland, Mich., a corporation of Michigan No Drawing. Application July 6, 1937, Serial No. 152,145

4 Claims. (Cl. 166—21)

This invention relates to the treatment of deep wells such as oil, gas, brine or water wells. It more particularly concerns the treatment of wells drilled into a calcareous formation.

The decline in production of wells, particularly those yielding oil or gas, is a matter of common observation. In attempts to raise the output of such wells, it is usual to treat them by introducing into the well and thence into the formation a charge of hydrochloric acid to dissolve calcareous matter in the formation, whereby its permeability to the flow of fluids is increased. Although such treatments are in general effective to increase the output, it has been found that the output of some wells is not materially increased by such treatment. This has been observed even with wells in formations which are substantially soluble in hydrochloric acid and should therefore be amenable to acid treatment.

My experiments have also shown that dissolving with hydrochloric acid alone the calcareous matter in cores taken from a variety of limestone formations does not always bring about as great an increase in their permeability as was to be expected in view of the amount of calcareous matter actually dissolved by the acid. In some cases, I have found that the acidation of calcareous cores may even decrease their permeability.

I have found that the anomalous effects of hydrochloric acid on the permeability of calcareous formations may be due to the deposition therein of a gelatinous precipitate of either ferric or aluminum hydrate or both. This precipitate is formed as the acid becomes neutralized by its action upon calcareous rocks which contain acid-soluble compounds of either ferric iron or aluminum. Whenever such formations are acidized, these acid-soluble compounds of either iron or aluminum, or both, are at first dissolved by the acid, but such compounds remain dissolved in the acid solution only as long as its pH value is less than that at which they are normally precipitated. As the acid solution continues to act upon the rock the pH value of the solution increases to about 4.2 to 5.4. Ferric hydrate and aluminum hydrate begin to precipitate at pH values of about 2.7 and 4, respectively, and are completely precipitated when the pH is about 5 and 5.4, respectively. Thus, the acid solution when spent or neutralized can no longer retain in solution the iron or aluminum previously dissolved and precipitation occurs, forming insoluble gelatinous deposits in the interstices of the rock. Therefore, instead of obtaining a substantial increase in the permeability of the rock and a corresponding increase in output from the well, acidation may produce only a minor increase, if any, or even a reduction in output, when the formation contains acid-soluble compounds of either ferric iron or aluminum.

It is an object of this invention to provide an improved method of acidizing wells wherein the aforementioned difficulties are largely overcome. Other objects and advantages will become apparent as the description of the invention proceeds.

I have found that the foregoing difficulties can be substantially, if not entirely, eliminated by adding to the acid employed to acidize the well an agent soluble in the acid that raises the pH value at which the hydroxides of iron and aluminum are normally precipitated. When such acid solution acts upon the calcareous matter and becomes neutralized thereby the iron and aluminum compounds dissolved by the acid remain in solution even though the pH of the acid solution when spent is thereby increased to between 4.2 and 5.4. I have found that by treating the formation surrounding the well bore with such a solution the precipitation of clogging deposits of hydrated iron and aluminum as the acid becomes neutralized by the calcareous matter does not occur, and a greater increase in output is obtainable than can be obtained by employing similar quantities of ordinary acid solutions of an equivalent total acidity.

In carrying out my improved treatment according to the invention, a charge of an aqueous mineral acid, e. g. hydrochloric acid, to which is added an agent soluble therein that is capable of preventing the precipitation of iron or aluminum hydrates at their normal pH values, is introduced into the well under sufficient pressure to be forced into the formation. Pressure is maintained, if necessary, upon the solution while it is permitted to act upon the formation. After a time the pressure is released and the well put back into production.

The agents suitable to add to the acid solution to prevent the precipitation of either iron or aluminum hydrate at their normal pH values are those compounds, usually organic, which form complex compounds of iron or aluminum having a relatively low degree of ionization and which do not form insoluble compounds of calcium or magnesium. Specific examples are: lactic acid, ammonium acetate, glycine, glycollic acid, citric acid, and the like. Such compounds do not substantially alter the surface tension of the acid solution or otherwise materially change the physical properties of the same, but do prevent iron or aluminum hydroxide from precipitating at pH values between about 2.7 and 5.4. Suitable proportions to use are those lying between about 0.5 and 10 per cent of the weight of the mineral acid solution and which permit the calcium and magnesium derivatives to remain in solution. When hydrochloric acid is used, a concentration of from about 5 to 25 per cent of HCl is satisfactory, although other concentrations may be used, if desired.

Among the advantages of my invention are that wells drilled into calcareous formations containing acid-soluble iron or aluminum compounds may be acidized so as to increase the permeability of the formation to the flow of fluids with greatly reduced risk of forming clogging deposits of the hydrates of either iron or aluminum when the acid becomes neutralized in the formation.

Other modes of applying the principle of my invention may be employed instead of those explained, change being made as regards the step or steps stated by any of the following claims, provided the equivalent of such stated step or steps be employed.

I therefore particularly point out and distinctly claim as my invention:

1. In a method of treating a well, the steps which consists in introducing thereinto a solution containing by weight from 5 to 25 per cent of HCl and from about 0.5 to 10 per cent of lactic acid, and applying pressure to the solution to force it into the formation.

2. In a method of treating a well, the steps which consists in introducing thereinto a solution containing by weight from 5 to 25 per cent of HCl and a relatively small proportion of citric acid, and applying pressure to the solution to force it into the formation.

3. In a method of treating a well, the steps which consists in introducing thereinto a solution containing by weight from 5 to 25 per cent of HCl and a relatively small proportion of glycine, and applying pressure to the solution to force it into the formation.

4. In the treatment of a well with an aqueous hydrochloric acid solution to increase the production thereof, the method of preventing the precipitation of gelatinous iron and aluminum hydroxide in the spent acid solution which comprises introducing into the well an aqueous hydrochloric acid solution containing about 0.5 to 10 per cent by weight of a substituted aliphatic carboxylic acid selected from the group consisting of lactic acid, glycine, glycollic acid, and citric acid, and applying pressure to the solution to force it into the formation.

SYLVIA M. STOESSER.